US007294436B2

(12) United States Patent
Abe et al.

(10) Patent No.: US 7,294,436 B2
(45) Date of Patent: *Nov. 13, 2007

(54) NONAQUEOUS ELECTROLYTIC SOLUTION AND LITHIUM SECONDARY BATTERIES

(75) Inventors: Koji Abe, Ube (JP); Yasuo Matsumori, Ube (JP)

(73) Assignee: Ube Industries, Ltd. (JP)

( * ) Notice: Subject to any disclaimer, the term of this patent is extended or adjusted under 35 U.S.C. 154(b) by 537 days.

This patent is subject to a terminal disclaimer.

(21) Appl. No.: 10/466,913

(22) PCT Filed: Jan. 24, 2002

(86) PCT No.: PCT/JP02/00518

§ 371 (c)(1),
(2), (4) Date: Jul. 23, 2003

(87) PCT Pub. No.: WO02/059999

PCT Pub. Date: Aug. 1, 2002

(65) Prior Publication Data

US 2004/0121239 A1 Jun. 24, 2004

(30) Foreign Application Priority Data

Jan. 24, 2001 (JP) ............................. 2001-015466
Jan. 24, 2001 (JP) ............................. 2001-015467

(51) Int. Cl.
*H01M 6/16* (2006.01)

(52) U.S. Cl. ............... 429/327; 429/326; 429/330; 429/332; 429/329; 429/333; 429/339; 429/231.1; 429/231.95

(58) Field of Classification Search ............. 429/326, 429/327, 330, 332, 329, 333, 339, 231.1, 429/231.95

See application file for complete search history.

(56) References Cited

U.S. PATENT DOCUMENTS 6,503,662 B1 * 1/2003 Hamamoto et al. ......... 429/326
2004/0028996 A1 * 2/2004 Hamamoto et al. ...... 429/231.1

FOREIGN PATENT DOCUMENTS

| EP | 0759641 A1 | 2/1997 |
|---|---|---|
| EP | 0776058 A2 | 5/1997 |
| JP | 05-036439 A | 2/1993 |
| JP | 07-302614 A | 11/1995 |
| JP | 10-275632 A | 10/1998 |
| JP | 2000-058116 A | 2/2000 |
| JP | 2001-167791 A | 6/2001 |
| JP | 2001-210364 A | 8/2001 |
| JP | 2001-332297 A | 11/2001 |
| JP | 2001-357876 A | 12/2001 |

* cited by examiner

*Primary Examiner*—Laura Weiner
(74) *Attorney, Agent, or Firm*—Nixon Peabody LLP; Jeffrey L. Costellia

(57) ABSTRACT

In order to manufacture a lithium secondary battery having excellent performances in safety under overcharge condition, cycle property, electric capacity, and storage endurance, 0.1 wt. % to 10 wt. % of a tert-alkylbenzene compound is favorably incorporated into a non-aqueous electrolytic solution comprising a non-aqueous solvent and an electrolyte, preferably in combination with 0.1 wt. % to 1.5 wt. % of a biphenyl compound.

4 Claims, No Drawings

NONAQUEOUS ELECTROLYTIC SOLUTION AND LITHIUM SECONDARY BATTERIES

FIELD OF INVENTION

The present invention relates to a lithium secondary battery showing high safety under the condition of overcharge, and excellent battery characteristics in cycle property, electric capacity and storage endurance, and further relates to a non-aqueous electrolytic solution favorably employable for preparing the lithium secondary battery.

BACKGROUND OF INVENTION

Recently, lithium secondary batteries are generally employed as electric sources for driving small electronic devices. They are also employed as electric sources for driving potable electronic transmission apparatuses such as small size video cameras, cellular phones, and note-size personal computers. They are also expected as electric sources for motor cars. The lithium secondary battery essentially comprises a positive electrode, a non-aqueous electrolytic solution, and a negative electrode. A lithium secondary battery utilizing a positive electrode of lithium compound oxide such as $LiCoO_2$ and a negative electrode of carbonaceous material or lithium metal is preferably used. As a non-aqueous solvent of the electrolytic solution for lithium secondary batteries, a carbonate such as ethylene carbonate (EC) or propylene carbonate (PC) is preferably used.

In the lithium secondary battery, the positive electrode releases an excessive lithium and the excessive lithium deposits on the negative electrode to produce dendrite, if the battery is overcharged to exceed the ordinary working voltage. Therefore, both of the positive and negative electrodes become unstable. When both electrodes become unstable, the carbonate in the electrolytic solution decomposes upon contact with the unstable electrodes and an exothermic reaction rapidly occurs. Accordingly, the battery abnormally generates heat and safety of the battery lowers. This phenomenon makes increased troubles in the case that the battery generates an electric current of an increased energy density.

Until now, it has been proposed that an addition of a small amount of an aromatic compound to the electrolytic solution is effective to assure the safety under the overcharge condition.

JP-A-7-302614 describes that an organic compound having a molecular weight of 500 or less and a π-electron orbit which gives a reversible oxidation-reduction potential at a potential of noble side relative to the positive electrode potential under the fully charged condition, which is represented by an anisole derivative, is used as an additive for an electrolytic solution.

JP-A-2000-156243-describes that an organic compound having a π-electron orbit which gives a reversible oxidation-reduction potential at a potential of noble side relative to the positive electrode potential under the fully charged condition, which is represented by an anisole derivative, biphenyl, and 4,4'-dimethylbiphenyl, is used as an additive for an electrolytic solution. It is described that the organic compound such as the above-mentioned anisole derivative or biphenyl derivative generates a redox shuttle in the battery, so that the safety of the battery is assured.

JP-A-9-106835 (corresponding to U.S. Pat. No. 5,879, 834) describes a measure for assuring safety of a battery under the overcharge condition by increasing an internal resistance in the battery. The increase of an internal resistance can be accomplished using a monomer such as biphenyl, 3-R-thiophene, 3-chlorothiophene or furan in an amount of approx. 1 to 4% to polymerize the compound such as biphenyl at a voltage exceeding the maximum working voltage of the battery.

JP-A-9-171840 (corresponding to U.S. Pat. Nos. 5,776, 627 and 6,033,797) also describes a measure for assuring safety of a battery under the overcharge condition, by working an internal current breaker in the battery. The internal current breaker can be worked using a monomer such as biphenyl, 3-R-thiophene, 3-chlorothiophene or furan in an amount of approx. 1 to 4% to polymerize a compound such as biphenyl and produce a gas at a voltage exceeding the maximum working voltage of the battery.

JP-A-10-321258 also describes a measure for assuring safety of a battery under the overcharge condition, by producing an electroconductive polymer in the battery. The production of an electroconductive polymer can be accomplished by using a monomer such as biphenyl, 3-R-thiophene, 3-chlorothiophene or furan in an amount of approx. 1 to 4% to polymerize the compound at a voltage exceeding the maximum working voltage of the battery.

JP-A-10-275632 describes that a nonionic aromatic compound having an alkyl group is incorporated into an organic electrolytic solution of a secondary battery which comprises a linear ester as a main solvent. As the nonionic aromatic compound having an alkyl group, there are mentioned a trimellitic ester, tri-2-ethylhexyl trimellitate, dimethyl phthalate, dibutyl phthalate, butylbenzene (normal, tertiary, or iso), cyclohexylbenzene and toluene.

JP-A-11-162512 (corresponding to U.S. Pat. No. 6,074, 777) describes that the addition of biphenyl or the like is apt to lower the battery performances such as cycle property when the battery is subjected to repeated cyclic procedure in which the battery is charged to a voltage exceeding the maximum voltage of 4.1 V, or the battery is charged and discharged at a high temperature such as 40° C. or higher for a long period of time, and that these problems are more apparently noted when the additive is added in an increased amount. This publication further describes that an electrolytic solution containing 2,2-diphenylpropane or its analogous compound is favorably employed for assuring the safety of a battery under the overcharge condition because 2,2-diphenylpropane or its analogous compound polymerizes to generate a gas, resulting in working of an internal current breaker, or to give an electroconductive polymer, resulting in generation of internal short-circuit.

The anisole derivatives and biphenyl derivatives described in JP-A-7-302614 and JP-A-2000-156243 favorably work under the condition of overcharge by utilizing redox shuttle, but give adverse effects to the cycle property and storage endurance. In more detail, the anisole derivatives and biphenyl derivatives gradually decompose when the battery is subjected to the repeated charge-discharge procedure, if they are locally subjected to an elevated voltage in the case that the battery is used at a temperature of 40° C. or higher, or that the battery is used at an ordinary working voltage. Therefore, the contents of the anisole derivative and biphenyl derivatives decrease by decomposition in the course of actual uses of the battery, so that the desired safety cannot be assured when the charge-discharge procedure is carried out after 300 cycle charge-discharge procedure is repeated.

Likewise, biphenyl, 3-R-thiophene, 3-chlorothiophene, and furan which are described in JP-A-9-106835, JP-A-9-171840, and JP-A-10-321258 favorably functions under the overcharge condition. However, as indicated in the aforementioned JP-A-11-162512, they give adverse effects to the cycle property and storage endurance. These problems are more prominently noted when the amount of biphenyl increases. In more detail, since biphenyl or the like decomposes by oxidation at a potential of 4.5 V or lower, the content of biphenyl or the like gradually decreases when it is locally subjected to somewhat high voltage in the course of working at 40° C. or higher or at an ordinary working voltage, resulting in decrease of the cycle life. Further, since the content of biphenyl or the like decreases due to its decomposition, the desired safety is sometimes not assured when the charge-discharge procedure is carried out after the 300 cycle charge-discharge procedure is repeated.

In addition, a battery containing 2,2-diphenylpropane and its analogous compound (which is described in JP-A-11-162512) shows only unsatisfactory safety under the overcharge condition, but the attained safety is higher than a battery having no such additive. On the other hand, it is known that the battery containing 2,2-diphenylpropane and its analogous compound shows a cycle property better than a battery containing biphenyl, but worse than a battery containing no additive. Thus, if a battery showing a cycle property better than that attained by the battery containing biphenyl is required, safety should be sacrificed.

It is an object of the present invention to provide a lithium secondary battery showing high safety under the overcharge condition, and excellent battery performances in cycle property, electric capacity and storage endurance, and further provide a non-aqueous electrolytic solution favorably employable for preparing the lithium secondary battery.

DISCLOSURE OF INVENTION

The invention resides in a non-aqueous electrolytic solution for lithium secondary batteries comprising a non-aqueous solvent and an electrolyte, which further contains 0.1 wt. % to 10 wt. % of a tert-alkylbenzene compound and 0.1 wt. % to 1.5 wt. % of a biphenyl compound.

The tert-alkylbenzene compound to be incorporated into the non-aqueous electrolytic solution of the invention preferably has a formula of $(R^1)(R^2)(R^3)C\text{-}\phi^1$ in which each of $R^1$, $R^2$, and $R^3$ independently is an alkyl group of 1 to 4 carbon atoms, and $\phi^1$ represents a benzene ring that may have 1 to 5 substituents on the ring. Particularly preferred is a compound having no substituent on the benzene ring. Most preferred tert-alkylbenzene compounds are tert-butylbenzene and tert-pentylbenzene. Moreover, a compound having 1 to 5 hydrocarbyl groups and/or halogen atoms on the benzene ring as the substituents is preferred.

The biphenyl compound to be incorporated into the non-aqueous electrolytic solution is preferably represented by $\phi^2\text{-}\phi^3$ in which each of $\phi^2$ and $\phi^3$ is a benzene ring that may have 1 to 5 substituents on the ring. Examples of the biphenyl compounds include biphenyl, o-terphenyl, m-terphenyl, p-terphenyl, 4-methylbiphenyl, 4-ethylbiphenyl, and 4-tert-butylbiphenyl. The biphenyl compound to be employed in the invention preferably shows an oxidation potential of 4.5 V or lower.

Further, the invention resides in a non-aqueous electrolytic solution for lithium secondary batteries comprising a non-aqueous solvent and an electrolyte, which further contains 0.1 wt. % to 20 wt. % of a tert-alkylbenzene compound (in which the tert-alkyl group has 5 to 13 carbon atoms). A representative example of the tert-alkylbenzene compound is tert-pentylbenzene. In other words, the tert-alkylbenzene compound having 5 to 13 carbon atoms can be employed for accomplishing the object of the invention without the biphenyl compound.

Furthermore, the invention resides in a lithium secondary battery comprising a positive electrode comprising a compound oxide containing lithium and cobalt, nickel or manganese, a negative electrode comprising lithium metal, lithium alloy or material capable of receiving and releasing lithium, and a non-aqueous electrolytic solution of the above-mentioned invention.

As described hereinbefore, the previously known methods for obviating overcharge are as follows:

a method of conducting a redox shuttle at a voltage of approx. 4.5 V;

a method of increasing an internal resistance of a battery by polymerizing an additive at a voltage of 4.5 V or lower;

a method of forming short-circuit by generating a gas to work an internal current breaker; and a method of assuring safety of a battery under the overcharge condition by producing a polymer to generate internal short-circuit.

In contrast, the present invention utilizes a non-aqueous electrolytic solution containing a tert-alkyl-benzene compound as an additive. The mechanism of the invention for assuring safety under the overcharge condition is considered as follows: the tert-alkylbenzene compound decomposes by oxidation at a potential of +4.6 V to +5.0 V (relative value to that of lithium), and cobalt or nickel in the positive electrode rapidly dissolves and deposits on the negative electrode to inhibit a reaction of a carbonate in the non-aqueous electrolytic solution with a lithium metal deposited on the negative electrode.

Further, in the invention, the internal short circuit may be formed in the battery by the deposition of cobalt or nickel, whereby the overcharge inhibitive effect can be attained and the safety of battery can be assured.

Furthermore, the addition of a small amount (0.1 wt. % to 1.5 wt. %) of a biphenyl compound together with the tert-alkylbenzene compound increases the overcharge inhibitive effect of the tert-alkylbenzene compound. The addition of a small amount of a biphenyl compound surprisingly further improve the battery performances which has not been expected from the previously accepted knowledge.

Moreover, since the tert-alkylbenzene compound contained in the non-aqueous electrolytic solution has such a high oxidation potential as +4.6 V to +5.0 V (relative value to the oxidation potential of lithium), the tert-alkylbenzene compound does not decompose under a locally occurring high voltage such as higher than 4.2 V in the case that the battery is used at such a high temperature as 40° C. or higher, and the charge-discharge procedure is repeated at an ordinary voltage.

The addition of a small amount (0.1 wt. % to 1.5 wt. %) of a biphenyl compound alone cannot inhibit overcharge of a battery. It is discovered, however, that it is effective to improve the battery performances, when it is employed in combination with a tert-alkylbenzene compound. This is considered that the decomposition of the biphenyl compound is low. Further, since the tert-alkylbenzene brings about an effect to inhibit overcharge, the safety of a battery is accomplished even in the case that a 300 cycle overcharge test is carried out. Therefore, it is considered that a lithium secondary battery showing not only the safety under the overcharge condition but also high battery performances in the cycle property, electric capacity and storage endurance can be manufactured.

DETAILED DESCRIPTION OF INVENTION

Examples of the tert-alkylbenzene compounds to be dissolved in an electrolytic solution comprising a non-aqueous solution and an electrolyte include the following compounds:

tert-butylbenzene, 1-fluoro-4-tert-butylbenzene, 1-chloro-4-tert-butylbenzene, 1-bromo-4-tert-butylbenzene, 1-iodo-4-tert-butylbenzene, 5-tert-butyl-m-xylene, 4-tert-butyltoluene, 3,5-di-tert-butyltoluene, 1,3-di-tert-butylbenzene, 1,4-di-tert-butylbenzene, 1,3-5-tri-tert-butylbenzene, tert-pentylbenzene, (1-ethyl-1-methylpropyl)benzene, (1,1-diethylpropyl)benzene, (1,1-dimethylbutyl)benzene, (1-ethyl-1-methylbutyl)benzene, (1-ethyl-1-ethylbutyl)benzene, (1,1,2-trimethylpropyl)benzene, 1-fluoro-4-tert-pentylbenzene, 1-chloro-4-tert-pentylbenzene, 1-bromo-4-tert-pentylbenzene, 1-iodo-4-tert-pentylbenzene, 5-tert-pentyl-m-xylene, 1-methyl-4-tert-pentylbenzene, 3,5-di-tert-pentyltoluene, 1,3-di-tert-pentylbenzene, 1,4-di-tert-pentylbenzene, and 1,3,5-tri-tert-pentylbenzene.

The tert-alkylbenzene compounds can be employed singly or in combination of two or more compounds.

A preferred tert-alkylbenzene compound to be added to the non-aqueous electrolytic solution of the invention is a compound having the formula of $(R^1)(R^2)(R^3)C-\phi^1$ [in which $R^1$ is an alkyl group of 2 to 4 carbon atoms, each of $R^2$ and $R^3$ independently is an alkyl group of 1 to 4 carbon atoms, and $\phi^1$ represents a benzene ring that may have 1 to 5 substituents on the ring]. The use of this compound is effective to improve particularly the cycle property of the non-aqueous electrolytic solution.

In the formula of $(R^1)(R^2)(R^3)C-\phi^1$, $R^1$ preferably is an alkyl group such as ethyl, propyl or butyl, and each of $R^2$ and $R^3$ independently is an alkyl group such as methyl, ethyl, propyl, or butyl. The alkyl group can be a linear or branched alkyl group.

In the benzene ring that may have 1 to 5 substituents on the ring which is represented by $\phi^1$, each of the substituents preferably is independently a linear alkyl group such as methyl, ethyl, propyl or butyl, or a branched alkyl group such as isopropyl, isobutyl, sec-butyl, tert-butyl, or tert-pentyl. Otherwise, the substituent can be a cycloalkyl group having 3 to 6 carbon atoms such as cyclopropyl or cyclohexyl; phenyl; benzyl; or an alkylated phenyl or benzyl group such as tolyl, tert-butylphenyl, tert-butylbenzyl, or tert-pentylphenyl; a halogen atom such as fluorine, chlorine, bromine, or iodine. The benzene ring preferably has a hydrocarbyl group having 1 to 12 carbon atoms or a halogen atom.

Examples of the above-mentioned tert-alkylbenzene compounds include tert-pentylbenzene, (1-ethyl-1-methylpropyl)benzene, (1,1-diethylpropyl)benzene, (1,1-dimethylbutyl)benzene, (1-ethyl-1-methylbutyl)benzene, (1-ethyl-1-ethylbutyl)benzene, and (1,1,2-trimethylpropyl)benzene. Examples of tert-pentylbenzene derivatives include 1-methyl-4-tert-pentylbenzene, 5-tert-pentyl-m-xylene, 1,3-di-tert-pentylbenzene, 1,4-di-tert-pentylbenzene, 1,3,5-tri-tert-pentylbenzene, 4-bromo-tert-pentylbenzene, 4-fluoro-tert-pentylbenzene, 4-chloro-tert-pentylbenzene, and 4-iodo-tert-pentylbenzene.

Examples of the biphenyl compounds include biphenyl, o-terphenyl, m-terphenyl, p-terphenyl, 4-methylbiphenyl, 4-ethylbiphenyl, and 4-tert-butylbiphenyl.

Particularly, if a portion of the tert-butylbenzene or the like having a high oxidation potential of 4.8 to 5.0 V is replaced with a biphenyl compound having a low oxidation potential of 4.5 V (e.g., o-terphenyl), the safety under the overcharge condition is enhanced.

If a portion of the tert-alkylbenzene compound is replaced with the biphenyl compound, the content of the tert-alkylbenzene preferably is 10 times or lower, more preferably 0.3 to 5 times, particularly preferably 0.5 to 3 times, as much as the content of the biphenyl compound.

As described hereinbefore, the combination of the tert-alkylbenzene compound and biphenyl compound which have different oxidation potential is effective to improve the security under the overcharge condition and the battery performances.

If the amount of the tert-alkylbenzene compound is excessive, the electrolytic solution may show a different electroconductivity and the battery performances may lower. If the amount is excessively low, enough safety-improving effect cannot be accomplished. Accordingly, the amount preferably is in the range of 0.1 to 10 wt. %, more preferably 1 to 5 wt. %, based on the amount of the electrolytic solution.

If the amount of the biphenyl compound is excessive, the biphenyl may decompose in the battery even under ordinary working conditions, and the battery performances may lower. If the amount is excessively low, enough safety-improving effect, and battery performances cannot be accomplished. Accordingly, the amount preferably is in the range of 0.1 to 1.5 wt. %, more preferably in the range of 0.3 to 0.9 wt. %, based on the amount of the electrolytic solution.

Examples of the non-aqueous solvents employable for the preparation of the non-aqueous electrolytic solution of the invention include cyclic carbonates such as ethylene carbonate (EC), propylene carbonate (PC), butylene carbonate (BC), and vinylene carbonate (VC); lactones such as γ-butylolactone; linear carbonates such as dimethyl carbonate (DMC), methyl ethyl carbonate (MEC), and diethyl carbonate (DEC); ethers such as tetrahydrofuran, 2-methyltetrahydrofuran, 1,4-dioxane, 1,2-dimethoxyethane, 1,2-diethoxyethane, and 1,2-dibutoxyethane; nitriles such as acetonitrile; esters such as methyl propionate, methyl pivalate, and octyl pivalate; and amides such as dimethylformamide.

The non-aqueous solvents can be employed singly or in combination of two or more solvents. There are no limitations with respect to possible combinations. Examples are combinations of a cyclic carbonate and a linear carbonate, a cyclic carbonate and a lactone, and three cyclic carbonates and a linear carbonate.

Examples of the electrolytes to be dissolved in the non-aqueous solvent for the preparation of a non-aqueous electrolytic solution include $LiPF_6$, $LiBF_4$, $LiClO_4$, $LiN(SO_2CF_3)_2$, $LiN(SO_2C_2F_5)_2$, $LiC(SO_2CF_3)_3$, $LiPF_4(CF_3)_2$, $LiPF_3(C_2F_5)_3$, $LiPF_3(CF_3)_3$, $LiPF_3(iso-C_3F_7)_3$, and $LiPF_5(iso-C_3F_7)$. These electrolytes can be employed singly or in combination of two or more electrolytes. Generally, the electrolyte can be incorporated into the non-aqueous solvent in such an amount to give an electrolytic solution of 0.1 M to 3 M, preferably 0.5 M to 1.5 M.

The electrolytic solution can be prepared, for instance, by mixing the above-mentioned non-aqueous solvents; dissolving the electrolyte in the mixture; and further dissolving at least one tert-alkylbenzene compound and optionally at least one biphenyl compound in the mixture solution.

The electrolytic solution of the invention is favorably employable for manufacture of a secondary battery, particularly lithium secondary battery. There are no limitations with respect to materials of the secondary battery other than the electrolytic solution, and various known materials can be employed.

The positive electrode active material preferably comprises a compound metal oxide containing lithium and cobalt or nickel. Examples of the compound metal oxides include $LiCoO_2$, $LiNiO_2$, $LiCo_{1-x}O_2$ (0.01<x<1), and $LiMn_2O_4$. Further, an appropriate mixture such as a mixture of $LiCoO_2$ and $LiMn_2O_4$, a mixture of $LiCoO_2$ and $LiNiO_2$, and a mixture of $LiMn_2O_4$ and $LiNiO_2$ can be employed.

The positive electrode can be manufactured by kneading the above-mentioned positive electrode active material, an electro-conductive material such as acetylene black or carbon black, and a binder such as poly(tetrafluoroethylene) (PTFE), poly(vinylidene fluoride) (PVDF), styrene-butadiene copolymer (SBR), acrylonitrile-butadiene copolymer (NBR) or carboxymethylcellulose (CMC) to give a positive electrode composition; coating the positive electrode composition on a collector such as aluminum foil, stainless foil, or lath plate; drying the coated composition; pressing the dried composition; and heating the pressed composition under vacuum at a temperature of approximately 50 to 250° C. for approximately 2 hours.

As the negative electrode (negative electrode active material), a lithium metal, a lithium alloy, a carbonaceous material which can absorb and release lithium [e.g., thermally decomposed carbonaceous material, coke, graphites such as artificial graphite and natural graphite, fired organic polymer, and carbon fiber], or a compound tin oxide can be employed. It is preferred to employ a carbonaceous material having a graphite crystal structure in which the lattice distance of lattice surface (002), namely, $d_{002}$, is in the range of 0.335 to 0.340 nm (nanometer). The negative electrode active material in the powdery form such as carbonaceous powder is preferably used in combination with a binder such as ethylene propylene diene terpolymer (EPDM), polytetrafluoroethylene (PTFE), poly(vinylidene fluoride) (PVDF), styrene-butadiene copolymer (SBR), acrylonitrile-butadiene copolymer (NBR) or carboxymethylcellulose (CMC).

There are no specific limitations with respect to the structure of the lithium secondary battery of the invention. For instance, the secondary battery can be a battery of coin type comprising a positive electrode, a negative electrode, and a separator in a single or plural layers, or a cylindrical or prismatic battery comprising a positive electrode, a negative electrode, and a separator roll. The separator can be made of microporous film, woven fabric or non-woven fabric.

The lithium secondary battery of the invention shows good cycle property for a long period of time even if it is used to work at a maximum working voltage of 4.2 V or higher, and the good cycle property can be maintained even if it is used to work at a maximum working voltage of 4.3 V. The cut-off voltage can be set to 2.0 V or higher, and further can be set to 2.5 V or higher. There is no limitation with respect to a current value, but a constant current of 0.1 to 3C is generally utilized. The battery of the invention can be charged and discharged in such a wide temperature range of −40° C. to 100° C. However, the temperature preferably is within 0 to 80° C.

EXAMPLE 1

1) Preparation of Electrolytic Solution

In a non-aqueous mixture of EC/PC/DEC=30/5/65 (volume ratio) was dissolved $LiPF_6$ to give an electrolytic solution of 1M concentration. Subsequently, 2.5 wt. % of tert-butylbenzene and 0.9 wt. % of biphenyl were added to the electrolytic solution.

2) Manufacture Lithium Secondary Battery and Measurement of its Battery Performances $LiCoO_2$ (positive electrode active material, 90 wt. %), acetylene black (electro-conductive material, 5 wt. %), and poly(vinylidene fluoride) (binder, 5 wt. %) were mixed. To the resulting mixture further added 1-methyl-2-pyrrolidone, to give a slurry. Thus produced slurry was coated on aluminum foil, dried, and pressed to give a positive electrode.

Artificial graphite (negative electrode active material, 95 wt. %) and poly(vinylidene fluoride) (binder, 5 wt. %) were mixed. To the resulting mixture was further added 1-methyl-2-pyrrolidone to give a slurry. Thus produced slurry was coated on copper foil, dried, and pressed to give a negative electrode.

A microporous polypropylene film separator and the above-mentioned electrolytic solution were placed in a cylindrical case to give a cylinder-type battery of 18650 size (diameter: 18 mm, height: 65 mm). To the battery were provided a pressure releasing port and an internal current breaker.

For performing a cycle test using the 18650 battery, the battery was charged at an elevated temperature (45° C.) with a constant electric current of 1.45 A (1C) under a constant voltage to reach 4.2 V for 3 hours in total. Subsequently, the battery was discharged to give a constant electric current 1.45 A (1C) to give a terminal voltage of 2.5 V. The charge-discharge cycle was repeated.

The initial discharge capacity was almost the same as the capacity measured in a battery using an 1M $LiPF_6$ and EC/PC/DEC (30/5/65, volume ratio) solvent mixture

COMPARISON EXAMPLE 1

After a 300 cycle charge-discharge procedure, the retention of discharge capacity was 84.4% of the initial discharge capacity (100%). Further, the battery showed good high temperature storage endurance.

Subsequently, the 18650 battery having been subjected to the 300 charge-discharge cycle test was excessively charged at a room temperature (20° C.) from a fully charged condition using a constant current of 2.9 A (2C), for evaluating a resistance to the overcharging. It was confirmed that the current broke after 22 minutes, and the highest surface temperature of the battery after the breakage of current was 67° C.

The materials of the tested 18560 size cylinder battery and the battery performances are set forth in Table 1.

EXAMPLE 2

The procedures of Example 1 were repeated except that the amount of biphenyl in the electrolytic solution was changed to 0.5 wt. %, to prepare a cylinder battery.

The materials of the tested battery, the discharge capacity retention ratio after the 300 cycle charge-discharge procedure, a period of time until breakage of current occurs, and the highest surface temperature of the battery after the breakage of current are shown in Table 1.

EXAMPLE 3

The procedures of Example 1 were repeated except that the amount of biphenyl in the electrolytic solution was changed to 1.3 wt. %, to prepare a cylinder battery.

The materials of the tested battery, the discharge capacity retention ratio after the 300 cycle charge-discharge procedure, a period of time until breakage of current occurs, and the highest surface temperature of the battery after the breakage of current are shown in Table 1.

EXAMPLE 4

The procedures of Example 1 were repeated except that the amount of biphenyl in the electrolytic solution was replaced with 0.9 wt. % of o-terphenyl, to prepare a cylinder battery.

The materials of the tested battery, the discharge capacity retention ratio after the 300 cycle charge-discharge procedure, a period of time until breakage of current occurs, and the highest surface temperature of the battery after the breakage of current are shown in Table 1.

EXAMPLE 5

The procedures of Example 1 were repeated except that the tert-butylbenzene was replaced with 2.5 wt. % of tert-pentylbenzene and the biphenyl was replaced with 0.9 wt. % of 4-ethylbiphenyl in the electrolytic solution, to prepare a cylinder battery.

The materials of the tested battery, the discharge capacity retention ratio after the 300 cycle charge-discharge procedure, a period of time until breakage of current occurs, and the highest surface temperature of the battery after the breakage of current are shown in Table 1.

EXAMPLE 6

The procedures of Example 1 were repeated except that tert-butylbenzene and tert-pentylbenzene were employed as tert-alkylbenzene compounds in an amount of 2 wt. % for each, and 4-methylbiphenyl was employed as the biphenyl compound in an amount of 0.5 wt. % in the electrolytic solution, to prepare a cylinder battery.

The materials of the tested battery, the discharge capacity retention ratio after the 300 cycle charge-discharge procedure, a period of time until breakage of current occurs, and the highest surface temperature of the battery after the breakage of current are shown in Table 1.

COMPARISON EXAMPLE 1

The procedures of Example 1 were repeated except that neither tert-alkylbenzene compound nor biphenyl compound was incorporated, to prepare a cylinder battery.

The materials of the tested battery, the discharge capacity retention ratio after the 300 cycle charge-discharge procedure, a period of time until breakage of current occurs, and the highest surface temperature of the battery after the breakage of current are shown in Table 1.

COMPARISON EXAMPLE 2

The procedures of Example 1 were repXpeated except that biphenyl was employed in an amount of 1.3 wt. % in the electrolytic solution and no tert-alkylbenzene compound was incorporated, to prepare a cylinder battery.

The materials of the tested battery, the discharge capacity retention ratio after the 300 cycle charge-discharge procedure, a period of time until breakage of current occurs, and the highest surface temperature of the battery after the breakage of current are shown in Table 1.

COMPARISON EXAMPLE 3

The procedures of Comparison Example 2 were repeated except that biphenyl was employed in an amount of 4 wt. % in the electrolytic solution and no tert-alkylbenzene compound was incorporated, to prepare a cylinder battery.

The materials of the tested battery, the discharge capacity retention ratio after the 300 cycle charge-discharge procedure, a period of time until breakage of current occurs, and the highest surface temperature of the battery after the breakage of current are shown in Table 1.

EXAMPLE 7

The procedures of Example 5 were repeated except that $LiCoO_2$ (positive electrode active material) was replaced with $LiNi_{0.8}Co_{0.2}O_2$, to prepare a cylinder battery.

The materials of the tested battery, the discharge capacity retention ratio after the 300 cycle charge-discharge procedure, a period of time until breakage of current occurs, and the highest surface temperature of the battery after the breakage of current are shown in Table 1.

COMPARISON EXAMPLE 4

The procedures of Example 7 were repeated except that neither tert-alkylbenzene compound nor biphenyl compound was incorporated, to prepare a cylinder battery. The battery performances were evaluated.

The materials of the tested battery and the battery performances are set forth in Table 1.

EXAMPLE 8

The procedures of Example 1 were repeated except that the tert-butylbenzene was replaced with 4-fluoro-tert-pentylbenzene in an amount of 3.0 wt. % in the electrolytic solution, to prepare a cylinder battery.

The materials of the tested battery, the discharge capacity retention ratio after the 300 cycle charge-discharge procedure, a period of time until breakage of current occurs, and the highest surface temperature of the battery after the breakage of current are shown in Table 1.

COMPARISON EXAMPLE 5

The procedures of Comparison Example 1 were repeated except that 3.0 wt. % of toluene and 0.5 wt. % of biphenyl were employed in the electrolytic solution, to prepare a cylinder battery.

The materials of the tested battery, the discharge capacity retention ratio after the 300 cycle charge-discharge procedure, a period of time until breakage of current occurs, and the highest surface temperature of the battery after the breakage of current are shown in Table 1.

COMPARISON EXAMPLE 6

The procedures of Comparison Example 1 were repeated except that 3.0 wt. % of n-butylbenzene and 0.5 wt. % of biphenyl were employed in the electrolytic solution, to prepare a cylinder battery.

The materials of the tested battery, the discharge capacity retention ratio after the 300 cycle charge-discharge procedure, a period of time until breakage of current occurs, and the highest surface temperature of the battery after the breakage of current are shown in Table 1.

COMPARISON EXAMPLE 7

The procedures of Comparison Example 1 were repeated except that 3.0 wt. % of di-n-butyl phthalate and 0.5 wt. % of biphenyl were employed in the electrolytic solution, to prepare a cylinder battery.

The materials of the tested battery, the discharge capacity retention ratio after the 300 cycle charge-discharge procedure, a period of time until breakage of current occurs, and the highest surface temperature of the battery after the breakage of current are shown in Table 1.

COMPARISON EXAMPLE 8

The procedures of Comparison Example 1 were repeated except that 3.0 wt. % of 4-fluorotoluene and 0.5 wt. % of biphenyl were employed in the electrolytic solution, to prepare a cylinder battery.

The materials of the tested battery, the discharge capacity retention ratio after the 300 cycle charge-discharge procedure, a period of time until breakage of current occurs, and the highest surface temperature of the battery after the breakage of current are shown in Table 1.

TABLE 1

| | Positive electrode Negative electrode | Tert-alkyl-benzene (wt. %) Biphenyl (wt. %) | Electrolytic solution (vol. ratio) | Current breakage High. temperature Discharge capacity retention |
|---|---|---|---|---|
| Ex. 1 | LiCoO$_2$ Graphite | tert-butyl-benzene (2.5) biphenyl (0.9) | 1M LiPF$_6$ EC/PC/DEC (30/5/65) | 22 min. 67° C. 84.4% |
| Ex. 2 | LiCoO$_2$ Graphite | tert-butyl-benzene (2.5) biphenyl (0.5) | 1M LiPF$_6$ EC/PC/DEC (30/5/65) | 24 min. 69° C. 84.0% |
| Ex. 3 | LiCoO$_2$ Graphite | tert-butyl-benzene (2.5) biphenyl (1.3) | 1M LiPF$_6$ EC/PC/DEC (30/5/65) | 20 min. 66° C. 82.7% |
| Ex. 4 | LiCoO$_2$ Graphite | tert-butyl-benzene (2.5) o-terphenyl(0.9) | 1M LiPF$_6$ EC/PC/DEC (30/5/65) | 22 min. 67° C. 84.3% |
| Ex. 5 | LiCoO$_2$ Graphite | tert-pentyl-benzene (2.5) 4-ethyl biphenyl (0.9) | 1M LiPF$_6$ EC/PC/DEC (30/5/65) | 21 min. 66° C. 82.3% |
| Ex. 6 | LiCoO$_2$ Graphite | tert-butyl-benzene (2) tert-pentyl-benzene (2) 4-methyl-biphenyl (0.5) | 1M LiPF$_6$ EC/PC/DEC (30/5/65) | 21 min. 66° C. 85.1% |
| Com. Ex. 1 | LiCoO$_2$ Graphite | None | 1M LiPF$_6$ EC/PC/DEC (30/5/65) | 31 min. thermal runaway 82.8% |
| Com. Ex. 2 | LiCoO$_2$ Graphite | biphenyl (1.3) | 1M LiPF$_6$ EC/PC/DEC (30/5/65) | 31 min. thermal runaway 78.3% |
| Com. Ex. 3 | LiCoO$_2$ Graphite | biphenyl (4) | 1M LiPF$_6$ EC/PC/DEC (30/5/65) | 18 min. 83° C. 72.1% |
| Ex. 7 | LiNi$_{0.8}$Co$_{0.2}$O$_2$ Graphite | tert-pentyl-benzene (2.5) 4-ethyl biphenyl (0.9) | 1M LiPF$_6$ EC/PC/DEC (30/5/65) | 21 min. 67° C. 82.5% |
| Com. Ex. 4 | LiNi$_{0.8}$Co$_{0.2}$O$_2$ Graphite | None | 1M LiPF$_6$ EC/PC/DEC (30/5/65) | 31 min. thermal runaway 80.4% |
| Ex. 8 | LiCoO$_2$ Graphite | 4-fluoro-tert-pentylbenzene (3) biphenyl (0.5) | 1M LiPF$_6$ EC/PC/DEC (30/5/65) | 23 min. 68° C. 84.3% |
| Com. Ex. 5 | LiCoO$_2$ Graphite | toluene (3) biphenyl (0.5) | 1M LiPF$_6$ EC/PC/DEC (30/5/65) | 31 min. thermal runaway 81.2% |
| Com. Ex. 6 | LiCoO$_2$ Graphite | n-butyl-benzene (3) biphenyl (0.5) | 1M LiPF$_6$ EC/PC/DEC (30/5/65) | 31 min. thermal runaway 80.1% |
| Com. Ex. 7 | LiCoO$_2$ Graphite | di-n-butyl-phthalate (3) biphenyl (0.5) | 1M LiPF$_6$ EC/PC/DEC (30/5/65) | 31 min. thermal runaway 78.4% |
| Com. Ex. 8 | LiCoO$_2$ Graphite | 4-fluoro-toluene (3) biphenyl (0.5) | 1M LiPF$_6$ EC/PC/DEC (30/5/65) | 25 min. thermal runaway 79.8% |

Remarks:
Current breakage: period of time to break current
High. temperature: Highest temperature of battery
Discharge capacity retention: ratio of discharge capacity after 300 cycle
Graphite: Artificial graphite In Examples 1 to 8, a sufficient amount of cobalt or nickel deposited on the negative electrode under the overcharge condition. It is clear that a lithium secondary battery utilizing a non-aqueous electrolytic solution which contains a tert-alkylbenzene compound and a biphenyl compound according to the invention shows safety under the overcharge condition and the cycle property better than the secondary batteries of Comparison Examples.

EXAMPLE 11

1) Preparation of Electrolytic Solution

In a non-aqueous mixture of EC/PC/DEC=30/5/65 (volume ratio) was dissolved LiPF$_6$ to give an electrolytic solution of 1M concentration. Subsequently, 2.0 wt. % of tert-pentylbenzene was added to the electrolytic solution.

2) Manufacture Lithium Secondary Battery and Measurement of its Battery Performances LiCoO$_2$ (positive electrode active material, 80 wt. %), acetylene black (electro-conductive material, 10 wt. %), and poly(vinylidene fluoride) (binder, 10 wt. %) were mixed. To the resulting mixture further added 1-methyl-2-pyrrolidone, to give a slurry. Thus produced slurry was coated on aluminum foil, dried, and pressed to give a positive electrode.

Artificial graphite (negative electrode active material, 90 wt. %) and poly(vinylidene fluoride) (binder, 10 wt. %) were mixed. To the resulting mixture was further added 1-methyl-2-pyrrolidone to give a slurry. Thus produced slurry was coated on copper foil, dried and pressed to give a negative electrode.

A microporous polypropylene film separator and the above-mentioned electrolytic solution were placed in a coin case to give a coin-type battery (diameter: 20 mm, thickness: 3.2 mm).

The coin battery was charged at a room temperature (20° C.) with a constant electric current of 0.8 mA under a constant voltage to reach 4.2 V for 5 hours. Subsequently, the battery was discharged to give a constant electric current 0.8 mA to give a terminal voltage of 2.7 V. The charge-discharge cycle was repeated.

The initial discharge capacity was almost the same as the capacity measured in a battery using an 1M LiPF$_6$ and EC/PC/DEC (30/5/65, volume ratio) solvent mixture containing no tert-alkylbenzene compound [Comparison Example 1].

After a 50 cycle charge-discharge procedure, the retention of discharge capacity was 92.8% of the initial discharge capacity (100%). Further, the battery showed good low temperature storage endurance.

The materials of the coin battery and the battery performances are set forth in Table 2.

EXAMPLE 12

The procedures of Example 11 were repeated except that the amount of tert-pentylbenzene in the non-aqueous electrolytic solution was changed to 5.0 wt. %, to prepare a coin battery.

After the 50 cycle charge-discharge procedure, the retention of discharge capacity was 91.5%.

The materials of the coin battery and the battery performances are set forth in Table 2.

EXAMPLE 13

The procedures of Example 11 were repeated except that the amount of tert-pentylbenzene in the non-aqueous electrolytic solution was changed to 0.5 wt. %, to prepare a coin battery.

After the 50 cycle charge-discharge procedure, the retention of discharge capacity was 90.3%.

The materials of the coin battery and the battery performances are set forth in Table 2.

COMPARISON EXAMPLE 11

In a non-aqueous mixture of EC/PC/DEC=30/5/65 (volume ratio) was dissolved $LiPF_6$ to give a non-aqueous electrolytic solution of 1M concentration. In this procedure, no tert-alkylbenzene compound was added.

A coin battery was manufactured in the same manner as in Example 11, except for employing the above-obtained non-aqueous electrolytic solution, and subjected to the evaluation of battery performances.

After the 50 cycle charge-discharge procedure, the retention of discharge capacity was 82.6%.

The materials of the coin battery and the battery performances are set forth in Table 2.

EXAMPLE 14

In a non-aqueous mixture of EC/PC/DEC=30/5/65 (volume ratio) was dissolved $LiPF_6$ to give a non-aqueous electrolytic solution of 1M concentration. Subsequently, 2.0 wt. % of tert-pentyltoluene was added to the non-aqueous electrolytic solution.

A coin battery was manufactured in the same manner as in Example 11, except for employing the above-obtained non-aqueous electrolytic solution, and subjected to the evaluation of battery performances.

The initial discharge capacity was almost the same as the capacity measured in a battery using an 1M $LiPF_6$ and EC/PC/DEC (30/5/65, volume ratio) solvent mixture containing no tert-alkylbenzene compound [Comparison Example 11].

After a 50 cycle charge-discharge procedure, the retention of discharge capacity was 92.1% of the initial discharge capacity (100%). Further, the battery showed good low temperature storage endurance.

The materials of the coin battery and the battery performances are set forth in Table 2.

EXAMPLE 15

The procedures of Example 11 were repeated except that (1,1-diethylpropyl)benzene was incorporated in an amount of 2.0 wt. % into the non-aqueous electrolytic solution, to prepare a coin battery.

After the 50 cycle charge-discharge procedure, the retention of discharge capacity was 91.9%.

The materials of the coin battery and the battery performances are set forth in Table 2.

EXAMPLE 16

The procedures of Example 11 were repeated except that a non-aqueous solvent of EC/PC/DEC/DMC (30/5/30/35, volume ratio) was employed and the artificial graphite was replaced with natural graphite, to prepare a non-aqueous electrolytic solution and manufacture a coin battery.

After the 50 cycle charge-discharge procedure, the retention of discharge capacity was 92.8%.

The materials of the coin battery and the battery performances are set forth in Table 2.

EXAMPLE 17

The procedures of Exxample 11 were repeated except that a non-aqueous electrolytic solution of 1M $LiPF_6$ in EC/PC/MEC/DMC (30/5/50/15, volume ratio) was employed and the $LiCoO_2$ (positive electrode active material) was replaced with $LiNi_{0.8}Co_{0.2}O_2$, to manufacture a coin battery.

After the 50 cycle charge-discharge procedure, the retention of discharge capacity was 91.1%.

The materials of the coin battery and the battery performances are set forth in Table 2.

EXAMPLE 18

The procedures of Example 11 were repeated except that a non-aqueous electrolytic solution of 1M $LiBF_4$ in EC/PC/DEC/DMC (30/5/30/35, volume ratio) was employed and the $LiCoO_2$ (positive electrode active material) was replaced with $LiMn_2O_4$, to manufacture a coin battery.

After the 50 cycle charge-discharge procedure, the retention of discharge capacity was 92.6%.

The materials of the coin battery and the battery performances are set forth in Table 2.

EXAMPLE 19

The procedures of Example 11 were repeated except that 4-fluoro-tert-pentylbenzene was employed as the additive in an amount of 3.0 wt. % to the non-aqueous electrolytic solution, to manufacture a coin battery.

After the 50 cycle charge-discharge procedure, the retention of discharge capacity was 92.7%.

The materials of the coin battery and the battery performances are set forth in Table 2.

COMPARISON EXAMPLE 12

The procedures of Example 11 were repeated except that toluene was employed as the additive in an amount of 3.0 wt. % in the non-aqueous electrolytic solution, to manufacture a coin battery.

After the 50 cycle charge-discharge procedure, the retention of discharge capacity was 81.3%.

The materials of the coin battery and the battery performances are set forth in Table 2.

COMPARISON EXAMPLE 13

The procedures of Comparison Example 11 were repeated except that n-butylbenzene was employed as the additive in an amount of 3.0 wt. % in the non-aqueous electrolytic solution, to manufacture a coin battery.

After the 50 cycle charge-discharge procedure, the retention of discharge capacity was 79.7%.

The materials of the coin battery and the battery performances are set forth in Table 2.

COMPARISON EXAMPLE 14

The procedures of Comparison Example 11 were repeated except that di-n-butyl phthalate was employed as the additive in an amount of 3.0 wt. % in the non-aqueous electrolytic solution, to manufacture a coin battery.

After the 50 cycle charge-discharge procedure, the retention of discharge capacity was 78.1%.

The materials of the coin battery and the battery performances are set forth in Table 2.

COMPARISON EXAMPLE 15

The procedures of Comparison Example 11 were repeated except that 4-fluorotoluene was employed as the additive in an amount of 3.0 wt. % in the non-aqueous electrolytic solution; to manufacture a coin battery.

After the 50 cycle charge-discharge procedure, the retention of discharge capacity was 80.6%.

The materials of the coin battery and the battery performances are set forth in Table 2.

TABLE 2

| | Positive electrode Negative electrode | Compound (wt. %) | Electrolytic solution (vol. ratio) | Initial discharge capacity (r.v.) Discharge capacity retention |
|---|---|---|---|---|
| Ex. 11 | $LiCoO_2$ Artificial graphite | tert-pentyl-benzene(2.0) | 1M $LiPF_6$ EC/PC/DEC (30/5/65) | 1.03 92.8% |
| Ex. 12 | $LiCoO_2$ Artificial graphite | tert-pentyl-benzene(5.0) | 1M $LiPF_6$ EC/PC/DEC (30/5/65) | 1.02 91.5% |
| Ex. 13 | $LiCoO_2$ Artificial graphite | tert-pentyl-benzene(0.5) | 1M $LiPF_6$ EC/PC/DEC (30/5/65) | 1.01 90.3% |
| Com. Ex. 11 | $LiCoO_2$ Artificial graphite | None | 1M $LiPF_6$ EC/PC/DEC (30/5/65) | 1.00 82.6% |
| Ex. 14 | $LiCoO_2$ Artificial graphite | 1-methyl-4-tert-pentyl-benzene(2.0) | 1M $LiPF_6$ EC/PC/DEC (30/5/65) | 1.02 92.1% |
| Ex. 15 | $LiCoO_2$ Artificial graphite | (1,1-diethyl-propyl)-benzene(2.0) | 1M $LiPF_6$ EC/PC/DEC (30/5/65) | 1.02 91.9% |
| Ex. 16 | $LiCoO_2$ Natural graphite | tert-pentyl-benzene(2.0) | 1M $LiPF_6$ EC/PC/DEC/DMC (30/5/30/35) | 1.02 92.8% |
| Ex. 17 | $LiNi_{0.8}Co_{0.2}O_2$ Artificial graphite | tert-pentyl-benzene(2.0) | 1M $LiPF_6$ EC/PC/MEC/DMC (30/5/50/15) | 1.15 91.1% |
| Ex. 18 | $LiMn_2O_4$ Artificial graphite | tert-pentyl-benzene(2.0) | 1M $LiBF_4$ EC/PC/DEC/DMC (30/5/30/35) | 0.99 92.6% |
| Ex. 19 | $LiCoO_2$ Artificial graphite | 4-fluoro-tert-pentyl-benzene(3.0) | 1M $LiPF_6$ EC/PC/DEC (30/5/65) | 1.02 92.7% |
| Com. Ex. 12 | $LiCoO_2$ Artificial graphite | toluene(3.0) | 1M $LiPF_6$ EC/PC/DEC (30/5/65) | 0.98 81.3% |
| Com. Ex. 13 | $LiCoO_2$ Artificial graphite | n-butyl-benzene(3.0) | 1M $LiPF_6$ EC/PC/DEC (30/5/65) | 0.97 79.7% |
| Com. Ex. 14 | $LiCoO_2$ Artificial graphite | di-n-butyl phthalate (3.0) | 1M $LiPF_6$ EC/PC/DEC (30/5/65) | 0.97 78.1% |
| Com. Ex. 15 | $LiCoO_2$ Artificial graphite | 4-fluoro-toluene(3.0) | 1M $LiPF_6$ EC/PC/DEC (30/5/65) | 0.98 80.6% |

UTILIZATION IN INDUSTRY

The present invention provides a lithium secondary battery showing high safety under overcharge condition, and excellent battery characteristics in cycle property, electric capacity and storage endurance.

What is claimed is:

1. A non-aqueous electrolytic solution for lithium secondary batteries comprising a non-aqueous solvent and an electrolyte, which further contains 0.1 wt. % to 20 wt. % of a tert-alkylbenzene compound under the condition that the tert-alkyl group has 5 to 13 carbon atoms.

2. The electrolytic solution of claim 1, wherein the tert-alkylbenzene compound is tert-pentylbenzene.

3. The electrolytic solution of claim 1, wherein the non-aqueous solvent is at least one compound selected from the group consisting of ethylene carbonate, propylene carbonate, butylene carbonate, vinylene carbonate, γ-butyrolactone, dimethyl carbonate, methyl ethyl carbonate, diethyl carbonate, tetrahydrofuran, 2-methyltetrahydrofuran, 1,4-dioxane, 1,2-dimethoxyethane, 1,2-diethoxyethane, 1,2-dibutoxyethane, acetonitrile, methyl propionate, methyl pivalate, octyl pivalate and dimethylformamide.

4. A lithium secondary battery comprising a positive electrode comprising a compound oxide containing lithium and cobalt, nickel or manganese, a negative electrode comprising lithium metal, lithium alloy, or material capable of receiving and releasing lithium, and a non-aqueous electrolytic solution of claim 1.

* * * * *